UNITED STATES PATENT OFFICE.

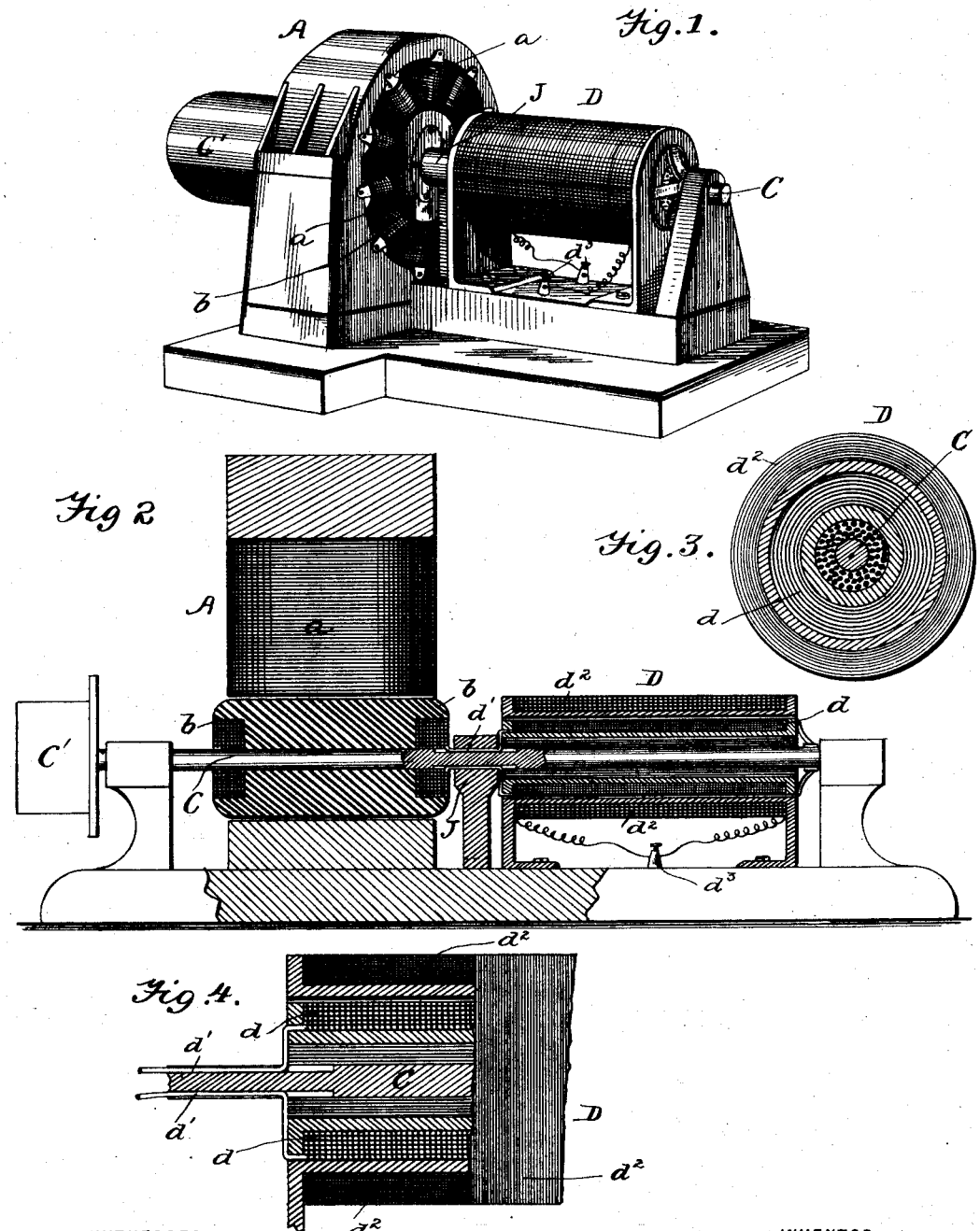

RICHARD PFUND, OF BROOKLYN, NEW YORK.

DYNAMO-ELECTRIC MACHINE.

SPECIFICATION forming part of Letters Patent No. 429,736, dated June 10, 1890.

Application filed February 24, 1890. Serial No. 341,388. (No model.)

*To all whom it may concern:*

Be it known that I, RICHARD PFUND, a citizen of the United States, residing in Brooklyn, in the county of Kings and State of New York, have invented certain new and useful Improvements in Dynamo-Electric Machines, of which the following is a specification.

My invention relates to dynamo-electric machines, its object being to provide means whereby all brushes and current-collectors on separately-excited alternating-current dynamos may be dispensed with.

The invention contemplates the direct conversion of the alternating currents generated in the armature of a machine through the agency of a converter or transformer whose primary coil is mounted upon and revolves with the armature-shaft and is connected directly with the coil or coils of the armature, and whose secondary coil is stationary, thus permitting of the direct connection therewith of the wires of the consumption-circuit.

My invention will now be described in detail with reference to the accompanying drawings, in which—

Figure 1 is a perspective view of a multipolar dynamo and a converter mounted upon its armature-shaft. Fig. 2 is a side view, partly in section and partly in elevation, of a bipolar machine and a converter similarly arranged. Fig. 3 is a transverse section of the converter, and Fig. 4 is a partial longitudinal section of the same.

Referring to the drawings by letter, A represents a dynamo-electric machine, either multipolar, as shown in Fig. 1, or bipolar, as shown in Fig. 2. Its field-magnets $a$ are excited from a separate source of electricity. Its armature $b$ is of the usual construction—that is, it carries coils of wire of any number and arranged in any approved manner.

C represents the armature-shaft, which is driven by belt through pulley $C'$. Upon this shaft is also mounted rigidly the primary coil $d$ of a converter or transformer D. The primary, with its iron core, is constructed cylindrical in shape and rotates with the armature-shaft. The primary coil is connected with the coil or coils on the armature of the dynamo by means of wires $d'$, which lie in grooves in the shaft and pass along the journal $j$, if there be one. The secondary coil $d^2$ of the converter is in the form of a hollow cylinder surrounding and inclosing the primary coil. The secondary may be supported in brackets or in any desired manner, and thus being fixed its terminals may be connected with a consumption-circuit through binding-posts $d^3$ $d^3$.

It is a well-known fact that the currents induced in the armature-coils of a dynamo are alternating in nature—that is, they flow alternately in opposite directions—and that the commutator or collector is a necessary device when straight currents are desired. It has also been necessary in the case where an alternating current is desired on the consumption-circuit to use rings and collecting-brushes sliding thereupon.

In my apparatus the commutator and all forms of sliding contacts are eliminated, and the alternating currents which are induced in the armature are delivered directly by the ordinary form of conductors to a converter, wherein the tension and quantity may be altered to conform to any use.

This apparatus would be particularly useful in the electric-welding process, where an enormous current is necessary and where it is desirable to have the apparatus as compact as possible. The invention, however, is by no means confined in its usefulness to electric welding.

The rapid rotation of the primary coil inside the secondary, which, however, is not necessary to the working of the apparatus, but unavoidable, I believe would also prove an advantage, in that the parts of the transformers would be ventilated.

It is obvious that the primary coil of the transformer may be mounted upon a shaft rotating synchronously with the armature-shaft and the same results obtained.

Having thus described my invention, I claim—

1. The combination, with a dynamo-electric machine, of a transformer whose primary coil is mounted to rotate synchronously with the armature of the dynamo.

2. The combination, with a dynamo-electric machine, of a transformer whose primary coil is mounted upon and rotates with the armature-shaft of the machine.

3. The combination, with a dynamo-electric machine, of a transformer whose primary coil is mounted upon and rotates with the armature-shaft of the machine, the primary coil being connected directly with the armature coil or coils.

4. The combination, with a dynamo-electric machine, of a transformer whose primary coil is mounted upon and rotates with the armature-shaft of the machine and whose secondary coil is stationary.

5. The combination, with a dynamo-electric machine, its armature, and shaft, of a transformer whose primary is mounted upon and revolves with the shaft, and conductors connecting the coils of the armature with the primary coil of the transformer, said conductors lying in a groove or grooves in the armature-shaft.

In witness whereof I have hereunto signed my name in the presence of two subscribing witnesses.

RICHARD PFUND.

Witnesses:
  WM. A. ROSENBAUM,
  THOMAS K. TRENCHARD.